Figure 1:
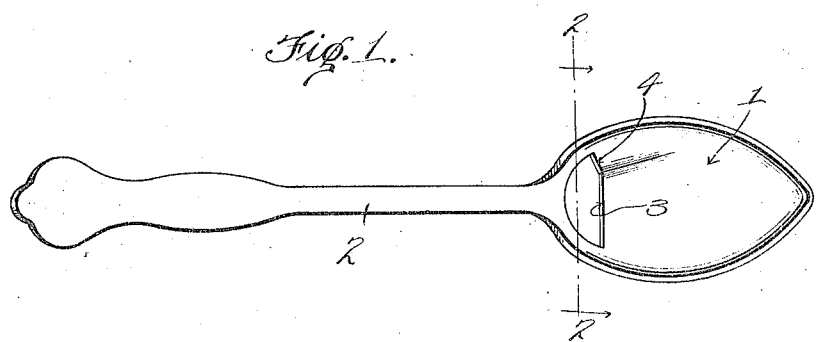

J. J. LIEB.
CORN SPOON.
APPLICATION FILED MAR. 15, 1917.

1,263,780.

Patented Apr. 23, 1918.

Inventor:
John J. Lieb.
by C. D. Enochs
Attorney

UNITED STATES PATENT OFFICE.

JOHN J. LIEB, OF FARIBAULT, MINNESOTA.

CORN-SPOON.

1,263,780.

Specification of Letters Patent. Patented Apr. 23, 1918.

Application filed March 15, 1917. Serial No. 155,109.

*To all whom it may concern:*

Be it known that I, JOHN J. LIEB, a citizen of the United States, and a resident of Faribault, in the county of Rice and State of Minnesota, have invented certain new and useful Improvements in Corn-Spoons, of which the following is a specification.

One object of my invention is to provide means for readily cutting corn from the cob on which it grows.

Another object of my invention is to combine a cutting means with a spoon.

Another object of my invention is to provide, with the bowl of a spoon, a cutting edge for the removal of grains of corn from the cob where it has grown.

With these and incidental objects in view, the invention consists of certain novel features of construction and combination of parts, the essential elements of which are described with reference to the drawing which accompanies and forms a part of this specification.

Figure 2:
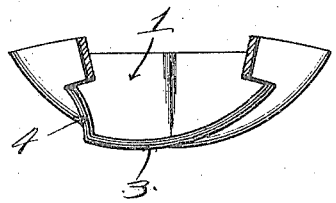

In the drawing, Figure 1 is a front elevation of my improved device, and Fig. 2 is a section taken on the line 2—2, Fig. 1.

It is a matter of embarrassment, and distasteful to some people to eat roasted or boiled corn directly from the cob, as is the ordinary custom, while the method of cutting the grains from the cob onto a plate and then eating them with a fork or spoon is tedious and more or less mussy.

It is to do away with the disadvantages now inherent in the eating of corn from the cob that I have devised a combined spoon and cutting edge embodied in this invention.

I prefer to form a spoon bowl 1, Fig. 1, having extending therefrom a handle 2 of ordinary style, and form in the rearward and lower side of the spoon bowl at 3 a cutting or knife like edge as plainly shown at 3, Fig. 2.

At one side of the cutting edge 3 the metal of the spoon bowl is shaped at substantially right angles as at 4, so the grains may be readily removed in even rows along the side of the device.

In using the new device, the user would grasp the handle 2, and by drawing the cutting edge 3 longitudinally along an ear of corn would cut therefrom, one or more rows of the grains which would be forced into the spoon bowl 1 by the motion of the spoon.

When the spoon bowl is filled to a sufficient extent, it would be transferred to the mouth to remove the grains and the spoon refilled in the same manner, and by rotating the cob all of the grains can be cleanly removed therefrom and transferred to the mouth without embarrassment to the user.

While I have described my invention and illustrated it in one particular design, I do not wish it understood that I limit myself to this construction, as it is evident that the invention may be varied in many ways within the scope of the following claim.

Claim:

As an article of manufacture, a corn spoon comprising in combination, a substantially oval shaped bowl having one end thereof formed into a cutting tool, having two edges, one formed substantially concentric with the general contour of said bowl, and the other formed at substantially right angles to said first cutting edge.

JOHN J. LIEB.